Patented July 12, 1949

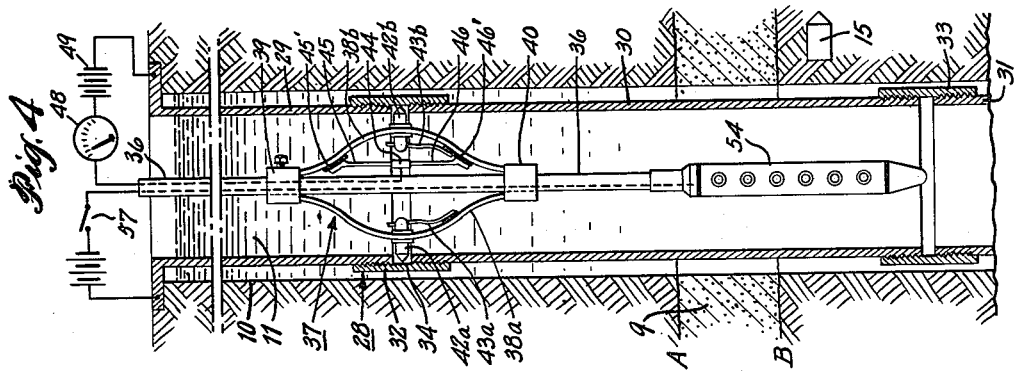
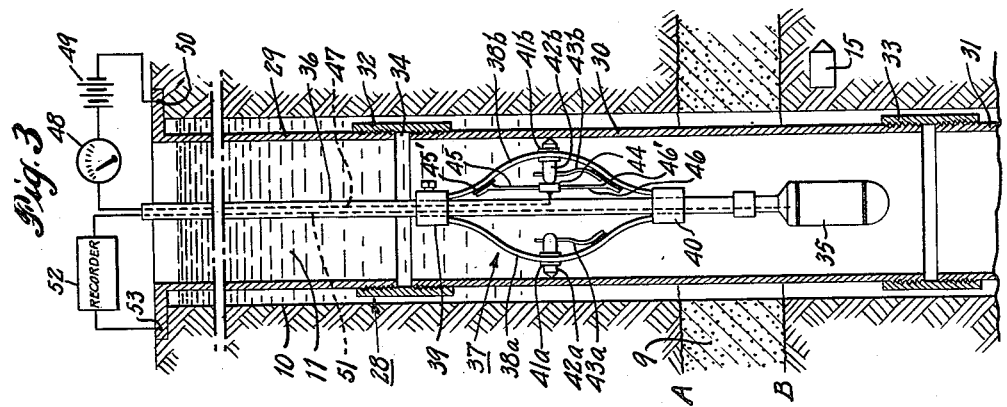
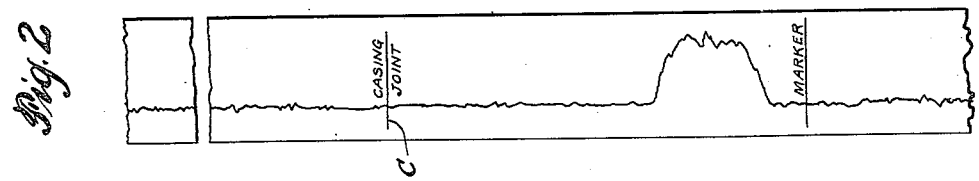
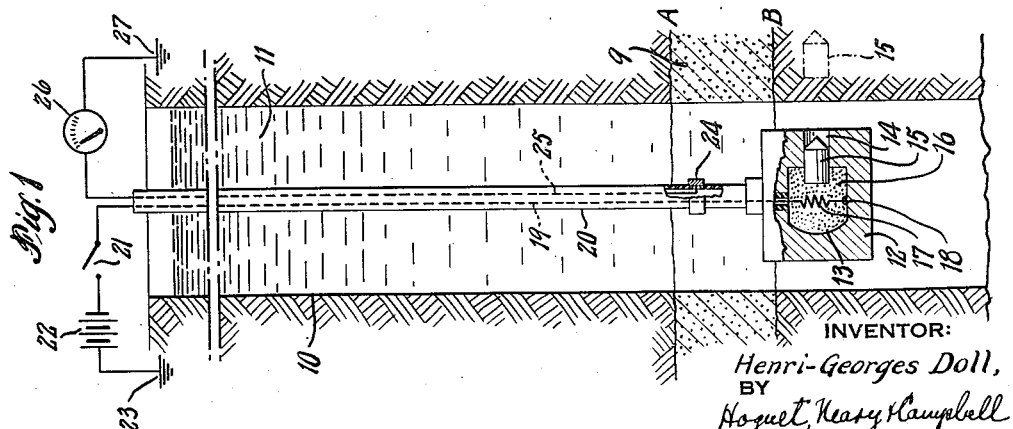

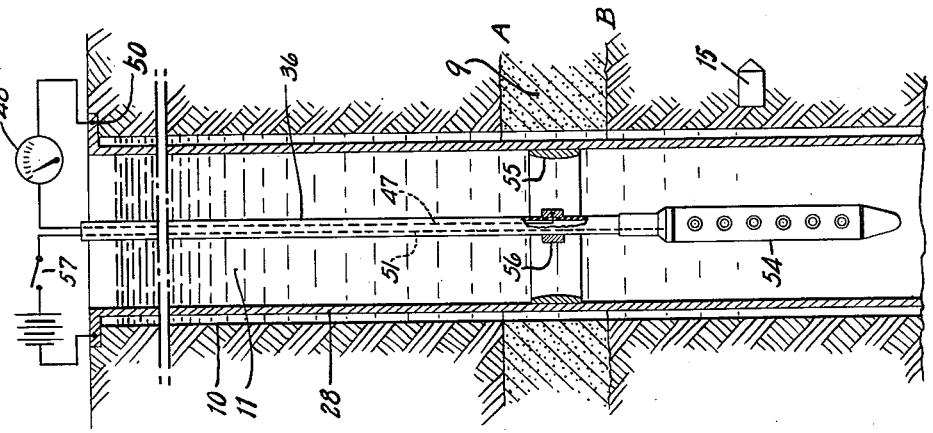
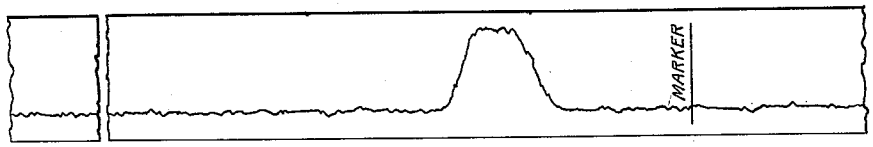
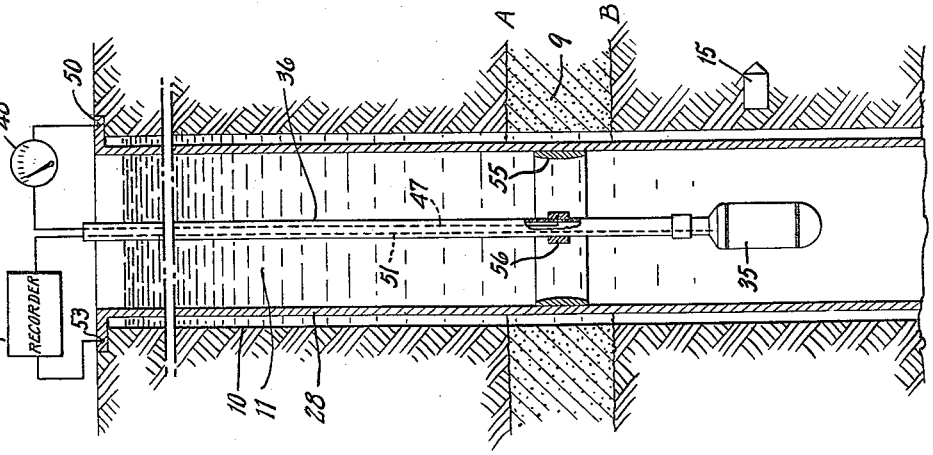
INVENTOR:
Henri-Georges Doll
BY
ATTORNEYS.

2,476,137

UNITED STATES PATENT OFFICE 2,476,137

METHOD OF POSITIONING APPARATUS IN BOREHOLES

Henri-Georges Doll, Houston, Tex., assignor to Schlumberger Well Surveying Corporation, Houston, Tex., a corporation of Delaware Application May 16, 1942, Serial No. 443,300

10 Claims. (Cl. 166—21)

The present invention relates to methods for positioning apparatus in cased bore holes at predetermined depths therein. More specifically, it relates to a new and improved method for accurately positioning apparatus in a cased bore hole in known depth relation to the strata penetrated thereby.

In the present oil field practice, wells are generally drilled to considerable depths in the earth and the depths and thicknesses of the oil bearing formations traversed thereby are determined in any known manner, as, for example, by "electrical logging" methods of the type disclosed in prior Patents Nos. 1,819,923 and 1,913,293, or by taking cores. After a well has been logged, it is lined with a metallic casing which is usually cemented in place. The well is then brought into production by perforating the casing in any known manner at the level of a formation known to contain oil.

Since the thickness of oil bearing sands is sometimes no greater than a few feet, the positioning in the casing of apparatus such as a gun perforator, for example, must be done very accurately. Frequently, the tolerance for such work does not exceed one foot in total depth ranging up to 13,000 feet. At the very considerable depths encountered in the field, it is very difficult to obtain this degree of precision.

The problem is further complicated by the fact that there is no accepted standard of reference for depth measurements in bore holes. Well operators invariably determine depths in a bore hole from drill pipe measurements whereas depth measurements in "electrical logging" and gun perforating operations, for example, are usually made by measuring displacements of an elastic cable on which the apparatus is supported.

In order to circumvent these difficulties, it has been proposed to establish a reference point or marker in the bore hole in known relation to a formation which is to be produced, and to base all subsequent measurements on this reference point. Radioactive or magnetic markers, for example, are especially suited for this purpose since they may be readily detected through a metallic casing by means of suitable radioactivity or magnetic field detectors. However, in order to position a gun perforator, for example, at a predetermined depth in a bore hole in accordance with this method, the relatively delicate marker detector associated therewith must be specially designed to withstand the tremendous shock and concussion produced by the firing of the perforator.

It is an object of the invention, accordingly, to provide a new and improved method for positioning apparatus at a predetermined level or levels in a bore hole with a high degree of accuracy.

Another object of the invention is to provide a new and improved method for accurately locating a predetermined level or levels in a bore hole.

A further object of the invention is to provide a novel method for locating, in a cased bore hole, a level, or levels, that have been determined prior to the insertion of the casing therein.

Still another object of the invention is to provide a new and improved method for accurately perforating a well casing in known relation to the strata surrounding the casing.

A further object of the invention is to provide a new and improved method for perforating a casing with a gun perforator in known, predetermined relation to the strata, in which the perforator may be brought very accurately into a predetermined relation with the strata without having fragile apparatus associated therewith.

According to the invention, one or more of the prelocated oil bearing formations or other strata of interest is identified by marking means that can be detected after the casing has been set in the bore hole. The marking means in each case is placed in known relation to the formation it identifies, either in the formation or at a known distance above or below it. After the casing has been set, a marker is established in the casing in the vicinity of the formation and in accurately determined, known relation to the marking means corresponding to the formation. The casing marker is then taken as a point of reference for all depth measurements that are to be made in the vicinity of the formation.

In a preferred embodiment of the invention the marker is established in the casing by lowering into the cased bore hole an assembly including casing marker establishing means and apparatus for detecting the formation marking means. The casing marker establishing means is of such character that a marker can be established without subjecting the formation marking means detector to any appreciable shock or concussion so that the latter need not be of special design.

When the casing marker has been accurately established at the desired level, apparatus such as a gun perforator, for example, is lowered into the bore hole in conjunction with a casing marker detector and is accurately brought to the desired level by using the casing marker as a reference point for depth measurements. The casing marker is of such character that it can be readily detected by sturdy reliable means that will not be damaged by any shock or concussion incident to the operation of the gun perforator or other tool with which it may be associated.

Any type of casing marker that can be detected by rugged detecting means may be employed in the method. For example, the marker may comprise a short section or sections of the casing that have been strongly magnetized in any known manner. The casing may be magnetized prior to its insertion in the bore hole or it may be magnetized in situ by apparatus of the type disclosed in prior Patent No. 2,259,904, for example. The same apparatus may also be employed for locating a magnetized section of the casing in accordance with the method.

Any structural anomaly in the casing, such as a casing coupling or joint between two adjacent sections of casing, for example, may be accurately located by means hereinafter described and used as a marker. While there are generally many such casing joints in a string of casing, the casing sections run from 20 to 40 feet in length. This is well within the accuracy of cable or pipe measurements so that the particular casing joint which serves as a marker can be readily located by approximate measurements of the cable or pipe which carries the tool into the bore hole.

Although the sum of the measured lengths of the various casing sections is often not equal to the total length of casing in the bore hole, because of the tendency of the threads at each joint to "make up" before the ends of the adjacent casing sections come into contact with one another, the spaces between the adjacent casing section ends are generally approximately equal so that the effective length of each casing section may be closely approximated. Hence, if the spacing between one casing joint and a formation marker is known, other casing joints in the same region may also be utilized as markers.

The casing marker may also comprise an electrical anomaly associated with the casing in the vicinity of the formation marker. The electrical anomaly may be a naturally existing or artificially created, localized potential distribution in the casing or it may be a marked localized difference in an electrical characteristic of the casing.

Experience has shown that naturally occurring potentials normally exist in a cased bore hole, which potentials vary abruptly from point to point therealong. Since these potentials do not change materially over long periods of time, any marked variation in the region of interest in the bore hole may be availed of as a casing marker. A marker of this type may be readily located by observing variations in the potential difference between an electrode moved through the bore hole and ground.

A localized potential distribution marker may also be artificially produced by forming a galvanic cell at the desired level in the bore hole. The galvanic cell may comprise a circuit including, for example, two different metals, one of which may be the metallic casing itself, and the conducting bore hole liquid. A number of representative markers of this type are disclosed in application Serial No. 379,983 for "Electrical depth marker," filed February 21, 1941 by Francis F. Segesman, now Patent No. 2,250,832, and they may be located by observing variations in the potential difference between an electrode lowered into the bore hole and a point of reference.

Although any metal dissimilar to that of the casing will exhibit a characteristic voltage, a casing marker of this type should preferably be made of a metal that lies below (is negative to) iron in the electromotive series of metals. This preference is based solely upon practical requirements. If a metal below iron, such as zinc, for example, is employed and if a suitable electrolyte such as the drilling fluid is present, the resulting battery action will tend to cause the zinc to dissolve in the electrolyte or be deposited in the casing. Thus, while corrosion may in time cause the marker to disappear, little or no damage to the casing will result. In fact, in some cases the presence of the marker may protect the adjacent portion of the casing from corrosive action.

A marked localized difference in an electrical characteristic of the casing may be produced by associating with the casing a relatively small portion of conductive or insulating material which serves as a marker. A marker of this type may be located by measuring, in situ, the desired electrical characteristic of the casing, which may be its electrical resistivity or impedance, for example. These markers may be placed at any desired location in the casing either before or after it is inserted in the well, and the spatial relation between the casing marker and the marker in the formation subsequently determined. Similar markers are more fully described in the above mentioned copending application of Francis F. Segesman.

In general, any desired phenomena, physical or otherwise, associated with the casing can be measured and any localized distinguishing characteristics, sudden variation, or discontinuity recorded and subsequently utilized as a reference depth marker after the spatial relation between it and the formation marker has been determined. Such characteristics may include, for example, the corrosion or polarization potentials normally found in cased wells, the permanent magnetism in the casing, or any other measurable property thereof which will remain substantially constant for a sufficient period of time to enable it to be employed in the method.

Additional objects and advantages of the invention will become apparent from the following detailed description taken in conjunction with the accompanying drawings, in which Figure 1 is a schematic diagram illustrating apparatus for identifying strata of interest in an uncased bore hole according to the invention by placing marking means in the formation adjacent the hole;

Figure 2 is a curve of spontaneous potentials obtained in the bore hole shown in Figure 1, on which the position of the formation marker is indicated;

Figure 3 illustrates schematically apparatus for establishing a casing marker in known relation to the formation marker, which casing marker comprises a joint between two adjacent sections of the casing;

Figure 4 is a schematic diagram of apparatus for locating a gun perforator at a predetermined level in a bore hole using a casing joint marker as a point of reference for depth measurements;

Figure 5 is a schematic diagram of apparatus for establishing a marking member in the casing in a predetermined spatial relationship to the formation marker;

Figure 6 is a curve of naturally occurring potentials in the bore hole showing the location of the casing marker; and Figure 7 is a schematic diagram of apparatus for locating a gun perforator in predetermined spatial relation to the formation by using the casing marker as a point of reference for depth measurements.

While, for the sake of brevity, the method will be described below in conjunction with certain specific types of apparatus, it is to be clearly understood that any other suitable types of formation and casing markers and marker detecting means therefor may be employed, and other tools besides a gun perforator may be positioned in a cased bore hole, in accordance with the method.

In the following description it will be assumed that the oil bearing formations traversed by the drill hole have been prelocated in any known manner, as for example by means of the methods disclosed in prior Patents Nos. 1,819,923 and 1,913,293. The curve of spontaneous potentials shown in Figure 2 may be obtained in accordance with the method disclosed in prior Patent No. 1,913,293 and it indicates that the bore hole 10 (Figure 1) traverses a porous formation 9 between the depths A and B. The bore hole 10 usually contains a column of liquid or drilling mud 11 previously employed in the drilling operations.

According to the method, porous formation 9 is identified, prior to the insertion of the casing in the bore hole, by marking means which is of such character that it can be detected after the casing has been set. This may be accomplished by means of the apparatus shown in Figure 1 of the drawings, for example, which comprises a conventional type well casing perforator 12 having a powder chamber 13 therein communicating with a laterally extending gun barrel 14. The marking means may be formed in the shape of a projectile 15 which is disposed in the gun barrel 14 and it may comprise a magnetized metal body or, preferably, a body containing a quantity of radioactive material, such as carnotite or uraninite, for example.

The powder chamber 13 contains an explosive charge 16 which is adapted to be ignited by means of an igniting filament 17, one end of which is grounded to the gun perforator 12 at the point 18 and the other end of which is connected to a conductor 19 in the supporting cable 20. The upper end of the conductor 19 is connected through a conventional type switch 21 to one terminal of a source of electrical energy 22, the other terminal of which is grounded at the point 23.

Disposed a short distance above the gun perforator 12 is an electrode 24 which is connected to a second conductor 25 in the supporting cable 20. The upper end of the conductor 25 is connected to one terminal of a conventional potential indicating instrument 26, preferably of the recording type, the other terminal of which is connected to ground at the point 27.

In operation, the electrode 24 and the gun perforator 12 are lowered together into the bore hole and the indications of the potential indicating instrument 26 are continuously observed. When the electrode 24 reaches the level of the formation between the depths A and B, the curve recorded thereby will swing sharply to the right, as shown in Fig. 2, indicating that the formation 9 has been reached. Although it is not necessary to do so, it is preferable to lower the electrode 24 to a position below the formation 9 and to raise it slowly until the reading of the instrument 26 indicates that it is again at the level of the formation 9.

At that instant the switch 21 at the surface of the earth is closed, energizing the igniting filament 17 and firing the marking projectile 15 into the formation to the position indicated in dotted lines. Inasmuch as the distance between the electrode 24 and the gun barrel 14 in the well casing perforator is known, the position of the marker 15 in the formation can be accurately marked on the spontaneous potential graph, as shown in Figure 2.

After each formation of interest has been identified in the manner indicated above, the bore hole is lined with a casing 28 (Figure 3) which may comprise, for example, a plurality of casing sections 29, 30 and 31 joined together by means of conventional type couplings 32 and 33. As indicated above, the threads on the casing sections 29 and 30 and the coupling 32, for example, tend to make up before the casing section ends come into contact with one another, so that a small annular gap 34 remains between them. In this embodiment of the invention the gap 34 will be taken as the casing marker.

The spatial relationship between the formation marker 15 and the casing marker 34 may be accurately determined by the apparatus shown in Figure 3 of the drawings, which comprises a formation marker or detector 35 secured to a conventional type electric cable 36 by means of which it may be raised and lowered from the surface of the earth. If the formation marker 15 is a magnetized projectile, then the detector 35 may comprise any conventional type of apparatus for detecting a magnetic field in a bore hole, such as that shown in prior Patent No. 1,980,100. If the projectile 15 emanates radioactive radiations, then the detector 35 should be a detector of radioactivity and it may comprise, for example, apparatus including a Geiger-Müller counter or ionization chamber.

Mounted on the cable 36 a short distance above detector 35 is a casing joint locator 37 comprising a plurality of angularly spaced apart leaf springs, two of which, 38a and 38b, are shown in Figure 3. The upper extremities of the springs 38a and 38b are secured to a stationary collar 39 mounted on the cable 36 and their lower extremities are secured to a movable collar 40 also mounted on the cable 36. Intermediate the ends of leaf springs 38a and 38b are mounted small insulating bushings 41a and 41b, respectively, through which extend radially movable contact members 42a and 42b. The contact members 42a and 42b are normally urged into engagement with the casing 28 by means of leaf springs 43a and 43b, respectively, which are secured to the leaf springs 38a and 38b, as shown in the figure.

Disposed directly behind the contact member 41b is an electrical contact 44 which is secured by means of the arms 45 and 46 to the leaf spring 38b. Insulating members 45' and 46' are provided to insulate the arms 45 and 46, respectively, from the leaf spring 38b. The contact 44 is connected to the conductor 47 in the supporting cable 36, the upper end of which is connected to any conventional type indicating circuit, which may be, for example, a potential indicating instrument 48 connected in series with a source of electrical energy 49, one terminal of which is grounded to the casing 28 at the point 50.

The response from the detector 35 is transmitted to the surface of the earth through the conductor 51 in the supporting cable 36. To this end, the upper end of the conductor 51 is connected to one terminal of a suitable indicating instrument 52, preferably of the recording type, the other terminal of which is grounded to the casing 28 at the point 53, the return circuit being completed through the casing 28, the conducting bore hole liquid 11 and the body of the detector 35.

In operation, the detecting means 35 and the casing joint locator 37 are positioned in the bore hole until the detector 35 is brought to the level of the formation marker 15, as indicated by the response of the indicating instrument 52. The apparatus is then raised until the contact members 42a and 42b of the casing joint locator 37 enter the casing joint marker 34. At that instant, the contact member 41b, which is normally maintained in engagement with the contact 44 by the casing 28, becomes disengaged therefrom, breaking the circuit and providing an indication at the surface of the earth that the casing marker 34 has been located.

The length of cable pulled up in raising the apparatus from one position to the other is measured and from it is computed the spatial distance between the formation marker 15 and the casing marker 34, the distance between the marker detector 35 and the contact member 41b being known. The position of the casing marker 34 is then marked on the curve shown in Figure 2 by the letter C.

Once the location of the casing marker 34 with respect to the formation marker 15 has been accurately determined in the manner described above, the casing marker 34 is used as a reference point for depth measurements in the vicinity of the formation 9. By way of illustration, the positioning of apparatus such as a gun perforator, for example, in the vicinity of the formation 9, using the casing joint marker 34 as the point of reference for depth measurements, will be described below.

Referring to Figure 4, a conventional type gun perforator 54 is lowered into the bore hole on the supporting cable 36, the casing joint locator 37 being mounted a short distance above it, as shown in the figure. The apparatus is positioned in the bore hole until the indicator 48 at the surface of the earth indicates that the casing joint 34 has been located. Since the spatial relationship between the casing joint 34 and the formation 9 and the distance between the contact member 42b of the casing joint locator 37 and the gun perforator 54 are known, it is a relatively simple matter to compute the distance that the apparatus must be moved to bring the gun perforator 54 to the exact level of the formation 9.

Figures 5, 6 and 7 illustrate another embodiment of the invention in which the casing marker comprises a localized electrical anomaly artificially produced in known spatial relation to the formation marker 15. As shown in Figure 5, the casing marker 55 preferably comprises a relatively narrow ring of a metal such as zinc or one of its compounds, for example, which has a lower position in the electromotive series of metals than the metal of the casing 28. The ring 55 may be placed in the casing 28 before the latter is inserted in the bore hole or it may be placed in position after the casing has been set, in any conventional manner as by spraying, for example. The zinc ring 55, the casing 28, and the conducting bore hole liquid 11 constitute a galvanic cell which produces a localized, distinctive potential distribution in the vicinity of the ring 55, which is utilized as the casing marker.

The casing marker detector in this embodiment may be an electrode 56 connected to the conductor 47, and lowered into the bore hole with the formation marker detector 35. The source of electrical energy 49 at the surface should preferably be eliminated in order that the indicating device 48 will provide indications of naturally occurring potentials between the electrode 56 in the drill hole and the ground point 50 at the surface of the earth.

This embodiment operates in essentially the same manner as the embodiment shown in Figures 3 and 4, described above, in that the arrival of the electrode 56 at the level of the casing marker 55 is indicated by a marked change in the reading of the indicating instrument 48 at the surface of the earth.

In order to locate apparatus such as a gun perforator, for example, in predetermined relation to the formation 9, the gun perforator 54 is substituted for the formation marker detector 35, as shown in Figure 7, and is positioned in the bore hole in the same manner as described above in connection with the apparatus shown in Figure 4. The casing 28 may then be perforated in the usual manner by closing the switch 57 at the surface of the earth.

Although a conventional type gun perforator has been disclosed in the foregoing description for locating the formation marker in known relation to a formation of interest, obviously any other suitable apparatus may be employed for this purpose. Also, although radio-active and magnetic formation markers have been suggested, markers of other types may be used, provided only that they may be detected through a metallic casing. The casing marker may also be of any desired type and the specific forms suggested in the foregoing description are to be regarded as examples merely and not as limiting the invention. Moreover, the method may be used for positioning any tool or apparatus at a desired level in a bore hole, and the invention is obviously not limited to the positioning of a well casing perforator.

From the foregoing, it will be apparent that the invention provides a new and improved method for accurately positioning apparatus in known spatial relation to a formation of interest in a cased bore hole. Specifically, it enables apparatus such as a gun perforator, for example, to be located opposite a formation of interest without the necessity for employing fragile or delicate detecting apparatus. By locating, in known spatial relationship to a formation marker, a casing marker that can be detected by rugged detecting means, apparatus such as a gun perforator, for example, may be accurately positioned in the bore hole by means of similar rugged detecting means that is capable of withstanding the tremendous shock and concussion produced in the operation of the perforator.

The several specific embodiments described above are intended to illustrate the invention and are not to be regarded as limiting it in any way, since they are susceptible of numerous changes in form and detail within the scope of the appended claims.

I claim:

1. A method of placing a reference marker in a bore hole, comprising the steps of lowering into the bore hole at least one well casing penetrating emanation producing marker means together with apparatus for depositing said marker means in the earth surrounding the bore hole, causing said depositing apparatus, when at a selected depth in the hole, to deposit said marker means in the earth surrounding the bore hole, withdrawing said depositing apparatus from the hole, casing the hole, lowering into the bore hole a detector for said marker means together with apparatus for establishing a detectable, physical condition in the casing as a reference marker, detecting said marker means with said detector, and establishing a detectable, physical condition in the casing in known relation to said marker means as a casing marker.

2. A method of placing a reference marker in a bore hole, comprising the steps of lowering into the bore hole at least one well casing penetrating emanation producing marker means together with apparatus for depositing said marker means in the earth surrounding the bore hole, causing said depositing apparatus, when at a selected depth in the hole, to deposit said marker means in the earth surrounding the bore hole, withdrawing said depositing apparatus from the hole, casing the hole with a casing such that at least one detectable, physical condition capable of serving as a casing marker is produced therein, lowering into the bore hole a detector for said marker means together with a detector for said casing physical condition, detecting said marker means and said casing physical condition by means of said respective detectors, and determining the spatial relation between said marker means and said casing physical condition.

3. A method of placing a reference marker in a bore hole, comprising the steps of lowering into the bore hole at least one well casing penetrating emanation producing marker member together with apparatus for depositing said marker member in the earth surrounding the bore hole, causing said depositing apparatus, when at a selected depth in the hole, to deposit said marker member in the earth surrounding the bore hole, withdrawing said depositing apparatus from the hole, casing the hole with a casing having at least one structural anomaly therein capable of serving as a casing marker, lowering into the bore hole a detector for said marker member together with a detector responsive to said detectable structural anomaly in the casing, detecting said marker member and said structural anomaly in the casing by means of said respective detectors, and determining the spatial relation between said marker member and said structural anomaly, thus establishing the latter as a reference marker.

4. A method of placing a reference marker in a bore hole, comprising the steps of lowering into the bore hole at least one well casing penetrating emanation producing marker member together with apparatus for depositing said marker member in the earth surrounding the bore hole, causing said depositing apparatus, when at a desired depth in the hole, to deposit said marker member in the earth surrounding the bore hole, withdrawing said depositing apparatus from the hole, casing the hole with a casing having at least one electrical anomaly therein capable of serving as a casing marker, lowering into the bore hole a detector for said marker member together with a detector responsive to said detectable electrical anomaly in the casing, detecting said marker member and said electrical anomaly by means of said respective detectors, and determining the spatial relation between said marker member and said electrical anomaly, thus establishing the latter as a reference marker.

5. A method of placing a reference marker in a bore hole, comprising the steps of lowering into the bore hole at least one well casing penetrating emanation producing marker member together with apparatus for depositing said marker member in the earth surrounding the bore hole, causing said depositing apparatus, when at a desired depth in the hole, to deposit said marker member in the earth surrounding the bore hole, withdrawing said depositing apparatus from the hole, casing the hole, producing a detectable local potential distribution at a selected location in the casing, lowering into the bore hole a detector for said marker member together with a detector responsive to said local potential distribution, detecting said marker member and said local potential distribution by means of said respective detectors, and determining the spatial relation between said marker member and said local potential distribution, thus establishing the latter as a reference marker.

6. A method of placing a reference marker in a bore hole, comprising the steps of lowering into the bore hole at least one well casing penetrating emanation producing marker member together with apparatus for depositing said marker member in the earth surrounding the bore hole, causing said depositing apparatus, when at a desired depth in the hole, to deposit said marker member in the earth surrounding the bore hole, withdrawing said depositing apparatus from the hole, casing the hole with a casing having a detectable portion provided with modified electrical characteristic, lowering into the bore hole a detector for said marker member together with a detector responsive to said casing electrical characteristic, detecting said marker member and said modified portion of the casing by means of said detectors, and determining the spatial relation between said marker member and said modified casing portion, thus establishing the latter as a reference marker.

7. A method of placing a reference marker in known relation to a formation traversed by a bore hole, comprising the steps of lowering into the bore hole a well casing penetrating emanation producing projectile together with gun mechanism for firing said projectile, simultaneously lowering therewith geophysical exploring means in known relation to said gun mechanism, obtaining, by said exploring means, identifying indications of a characteristic of the formations surrounding the bore hole, causing said gun mechanism to discharge said projectile into the earth surrounding the bore hole and in known and arbitrarily selected relation to an identified one of such formations, withdrawing said gun mechanism from the hole, casing the hole, lowering into the casing a detector responsive to the emanation produced by said projectile together with apparatus for establishing a detectable physical condition in the casing as a reference marker, detecting said projectile by said detecting means, and establishing a detectable physical condition in the casing in known relation to said projectile as a reference marker for said one identified formation.

8. A method of placing a reference marker in known relation to a formation traversed by a bore hole, comprising the steps of lowering into the bore hole a well casing penetrating emanation producing projectile together with gun mechanism for firing said projectile, simultaneously lowering therewith geophysical exploring means in known relation to said gun mechanism, obtaining, by said exploring means, identifying indications of a characteristic of the formations surrounding the bore hole, causing said gun mechanism to discharge said projectile into the earth surrounding the bore hole and in known and arbitrarily selected relation to an identified one of such formations, withdrawing said gun mechanism from the hole, casing the hole with a casing such that at least one detectable physical condition capable of serving as a casing marker is produced therein, lowering into the casing a detector responsive to the emanation produced by said projectile together with a detector responsive to said detectable physical casing condition, detecting said projectile and said casing physical condition by means of said respective detectors, and determining the spatial relation between said projectile and said casing physical condition, thus establishing the latter as a reference marker for said one identified formation.

9. A method of placing a reference marker in known relation to a formation traversed by a bore hole, comprising the steps of lowering into the bore hole a well casing penetrating emanation producing projectile together with gun mechanism for firing said projectile, simultaneously lowering therewith geophysical exploring means in known relation to said gun mechanism, obtaining, by said exploring means, identifying indications of a characteristic of the formations surrounding the bore hole, causing said gun mechanism to discharge said projectile into the earth surrounding the bore hole and in known and arbitrarily selected relation to an identified one of said formations, withdrawing said gun mechanism from the hole, lining the hole with a casing having longitudinally spaced apart joints therein, lowering into the casing a detector responsive to the emanation produced by said projectile together with a casing joint detector, detecting said projectile and a particular casing joint by means of said respective detectors, and determining the spatial relation between said projectile and said particular casing joint, thus establishing the latter as a reference marker for said one identified formation.

10. A method of placing a reference marker in known relation to a formation traversed by a bore hole, comprising the steps of lowering into the bore hole a well casing penetrating emanation producing projectile together with gun mechanism for firing said projectile, simultaneously lowering therewith geophysical exploring means in known relation to said gun mechanism, obtaining, by said exploring means, identifying indications of a characteristic of the formations surrounding the bore hole, causing said gun mechanism to discharge said projectile into the earth surrounding the bore hole and in known and arbitrarily selected relation to an identified one of said formations, withdrawing said gun mechanism from the hole, placing a casing in the hole, forming in the casing a galvanic cell which produces a localized, detectable potential distribution in the casing, lowering into the casing a detector for said projectile together with an exploring electrode, detecting said projectile and said localized potential distribution by means of said detector and said exploring electrode, respectively, and determining the spatial relation between said projectile and said localized potential distribution, thus establishing the latter as a reference marker for said one identified formation.

HENRI-GEORGES DOLL.

REFERENCES CITED

The following references are of record in the file of this patent:

UNITED STATES PATENTS

| Number | Name | Date |
| --- | --- | --- |
| 1,893,600 | Shull | Jan. 10, 1933 |
| 2,246,542 | Smith | June 24, 1941 |